UNITED STATES PATENT OFFICE.

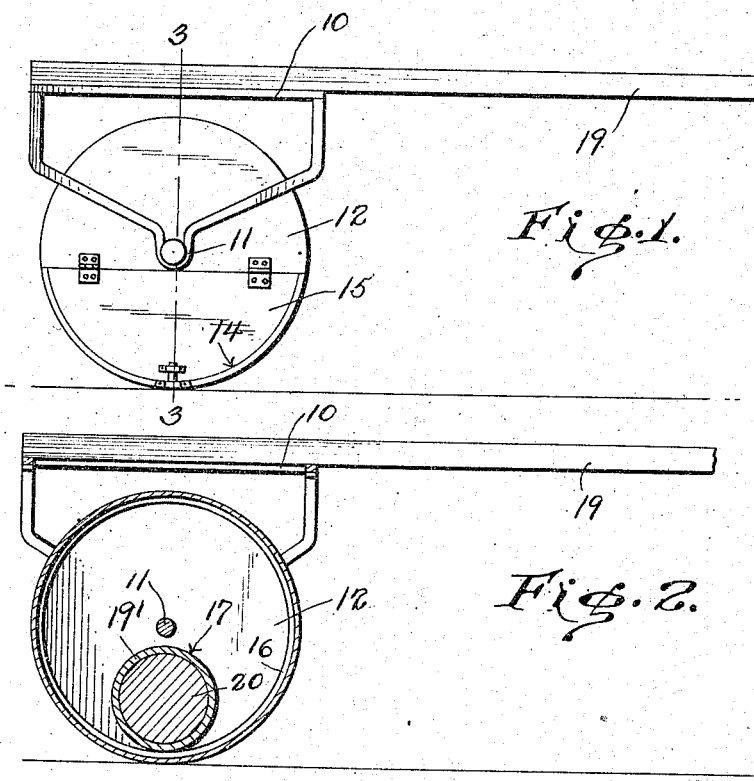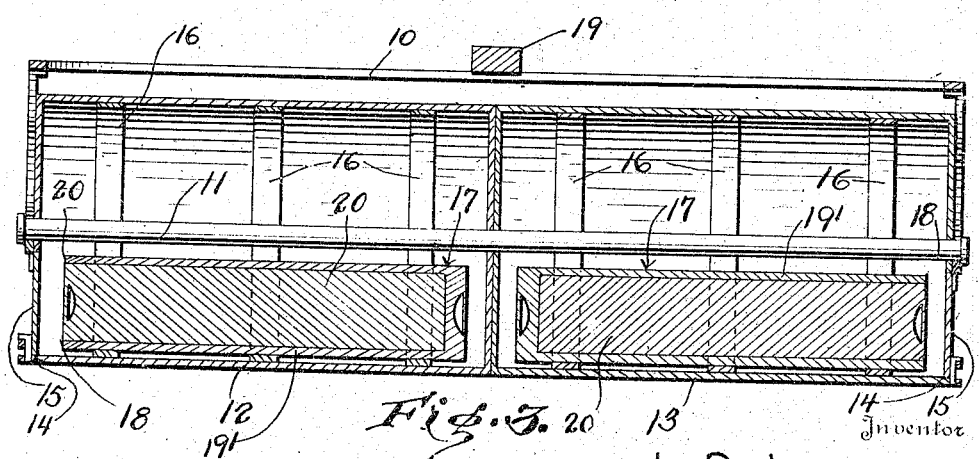

LEE R. LEE, OF ZALMA, MISSOURI.

LAND-ROLLER AND CLOD-CRUSHER.

1,196,464.

Specification of Letters Patent. Patented Aug. 29, 1916.

Application filed November 2, 1915. Serial No. 59,181.

*To all whom it may concern:*

Be it known that I, LEE R. LEE, a citizen of the United States, residing at Zalma, in the county of Bollinger, State of Missouri, have invented certain new and useful Improvements in Land-Rollers and Clod-Crushers; and I do hereby declare the following to be a full, clear, and exact description of the invention, such as will enable others skilled in the art to which it appertains to make and use the same.

This invention relates to land rollers and clod crushers.

The object of the invention is to provide a device of the class described which will be simple in construction, efficient in operation and which can be manufactured at a comparatively low cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a view in elevation of the invention; Fig. 2, a vertical section of same, and Fig. 3, a section on the line 3—3 of Fig. 1.

Referring to the drawings the invention is shown as comprising a frame 10 upon which is mounted an axle 11. Rotatable on the axle 11 are drums 12 and 13. These drums are similar and are constructed of relatively thin material of light weight and have their outer ends provided with an opening 14 adapted to be closed by a hinged door 15. Mounted within each drum 12 and 13 is a series of endless bands or ribs 16 and disposed within each drum is a weighted roller 17 adapted to travel on the related bands 16, during rotation of the drum as will be obvious. The outer end of each roller 17 is provided with a hand hold 18 whereby the roller may be readily inserted through the opening 15 and also removed through said opening when desired.

It will be obvious that by providing the bands 16 the active friction surface of the rollers 17 during operation of the device is materially decreased and effectiveness of the machine thereby enhanced. A suitable draft tongue 19 is secured to the frame 10 for the purpose of hitching draft animals to the roller.

Each of the rollers 17 comprises an outer tubular section 19' and an inner solid section 20, the latter being detachably engaged in the former so that if it is desired to decrease the weight of the rollers the section 20 can be removed from the section 19 and either section employed.

What is claimed is:—

A land roller and clod crusher comprising a frame, an axle carried by the frame, a hollow drum rotatably mounted on the axle and having an opening in one end, a hinged door for closing said opening, a plurality of endless bands mounted on the inner wall of the drum, and a weighted roller disposed within the drum and movable on said bands, said roller being formed of separate sections one of which is provided with a longitudinal recess and the other formed solid and detachably engaged in said recess.

In testimony whereof, I affix my signature, in the presence of two witnesses.

LEE R. LEE.

Witnesses:
J. W. WILSON,
E. G. HIMIROW.